US008397556B2

(12) United States Patent

Last et al.

(10) Patent No.: US 8,397,556 B2

(45) Date of Patent: Mar. 19, 2013

(54) DEVICE AND METHOD FOR DETERMINING COMBUSTION CHAMBER PRESSURE

(75) Inventors: Bernd Last, Reutlingen (DE); Hans Houben, Wuerselen (DE); Yue Cheng, Liaoning (CN); Christian Pottiez, Eppingen (DE); Frank Pechhold, Ludwigsburg (DE); Arno Marto, Weil der Stadt (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 0 days.

(21) Appl. No.: 12/989,043

(22) PCT Filed: Apr. 22, 2009

(86) PCT No.: PCT/DE2009/000535

§ 371 (c)(1),
(2), (4) Date: Dec. 20, 2010

(87) PCT Pub. No.: WO2009/129791

PCT Pub. Date: Oct. 29, 2009

(65) Prior Publication Data

US 2011/0146393 A1 Jun. 23, 2011

(30) Foreign Application Priority Data

Apr. 23, 2008 (DE) ........................ 10 2008 020 510

(51) Int. Cl.
*G01M 15/08* (2006.01)

(52) U.S. Cl. .................................................... 73/114.19

(58) Field of Classification Search ............... 73/114.16, 73/114.18, 114.19
See application file for complete search history.

(56) References Cited

U.S. PATENT DOCUMENTS

| | | | | |
|---|---|---|---|---|
| 4,879,913 | A * | 11/1989 | Lerat | 73/862.043 |
| 4,911,023 | A * | 3/1990 | Izumi et al. | 73/862.044 |
| 4,967,605 | A * | 11/1990 | Okada | 73/862.044 |
| 5,726,351 | A * | 3/1998 | Glaser | 73/114.19 |
| 7,032,438 | B2 * | 4/2006 | Heinzelmann et al. | 73/114.21 |
| 7,228,730 | B2 * | 6/2007 | Haussner et al. | 73/114.19 |
| 7,350,494 | B2 * | 4/2008 | Schricker et al. | 123/145 A |
| 7,431,003 | B2 * | 10/2008 | Ludwig et al. | 123/145 A |
| 7,441,470 | B2 * | 10/2008 | Morimoto | 73/862.045 |
| 7,472,600 | B2 * | 1/2009 | Wolfer et al. | 73/723 |
| 7,500,406 | B2 * | 3/2009 | Morimoto | 73/862.044 |
| 8,079,253 | B2 * | 12/2011 | Scholzen et al. | 73/114.18 |
| 2006/0053875 | A1 | 3/2006 | Haussner et al. | |
| 2007/0209624 | A1 | 9/2007 | Ludwig et al. | |
| 2007/0245805 | A1 | 10/2007 | Schricker et al. | |
| 2010/0032423 | A1 | 2/2010 | Kern et al. | |
| 2011/0146392 | A1 * | 6/2011 | Cheng et al. | 73/114.19 |

FOREIGN PATENT DOCUMENTS

| | | | |
|---|---|---|---|
| DE | 103 46 295 | A1 | 4/2004 |
| DE | 102004056749 | B3 * | 5/2006 |
| DE | 10 2005 017 802 | A1 | 10/2006 |
| DE | 10 2005 043 688 | A1 | 3/2007 |
| DE | 10 2006 041 124 | A1 | 3/2008 |

* cited by examiner

*Primary Examiner* — Freddie Kirkland, III

(57) ABSTRACT

The invention relates to a device and a method for determining combustion chamber pressure, having at least one glow filament, at least one measuring element, at least two spring membranes, and at least one tubular base.

8 Claims, 3 Drawing Sheets

DEVICE AND METHOD FOR DETERMINING COMBUSTION CHAMBER PRESSURE

This application is a U.S. National-Stage entry under 35 U.S.C. 371 based on International Application No. PCT/DE09/00535, filed Apr. 22, 2009 and which claims priority to German Application No. 10 2008 020 510.9, filed Apr. 23, 2008, which are all hereby incorporated in their entirety by reference.

The invention relates to a device and a method for determining combustion chamber pressure, in particular in internal combustion engines. Combustion chamber pressure sensors of that type are known e.g. from DE 103 43 521; described here is a pressure measuring glow plug for a diesel engine, comprising a plug base for insertion into a cylinder of the diesel engine, a heating rod disposed in the plug base, and a pressure sensor which is disposed, under preload, between the heating rod and the plug base, in a manner such that the pressure sensor is acted upon by the pressure in the combustion chamber of the cylinder, wherein the heating rod is situated in the plug base such that it is slidably displaceable in the axial direction and transfers the pressure in the combustion chamber of the cylinder to the pressure sensor.

Furthermore, a combustion chamber pressure sensor of that type is disclosed in DE 103 46 295 which shows a glow plug having a cylindrical housing with one end side situated close to a combustion chamber of an engine, and which includes a threaded section that is engaged with the engine; a tubular component that is held inside the housing in a manner such that the one end side of the tubular component extends out of the one end side of the cylindrical housing; a heat-generating component that is disposed inside the tubular component and generates heat in response to supplied current; a metallic central shaft having one end side that is electrically connected to the heat-generating component, the other end side extending out of the other end side of the housing; and a combustion pressure sensor for detecting a combustion pressure of the engine that, when produced, is transferred via the central shaft as an axial force acting on the tubular component, wherein a section of the central shaft that is situated inside the tubular component has a coefficient of thermal expansion of less than or equal to 10.5*10<−6>/[deg.]C.

Publication DE 10 2005 016 463 discloses a sheathed-element glow plug for a compression-ignition internal combustion engine, which comprises a first module that contains a heating element and a plug housing, and a pressure measuring module, wherein the pressure measuring module adjoins the first module on a side facing away from the heating element, wherein at least one force measuring element is integrated in the pressure measuring module, wherein the at least one force measuring element is designed to generate an electrical signal as a function of a force, wherein the at least one force measuring element is connected to the heating element in a manner such that a force can be transferred via the heating element to the at least one force measuring element.

Publication DE 10 2005 017 802 makes known a sheathed-element glow plug for a compression-ignition internal combustion engine comprising a heating element and a plug housing, wherein the plug housing includes at least one force measuring element, wherein the at least one force measuring element is connected to the heating element in a manner such that a force can be transferred via the heating element to the at least one force measuring element, wherein the sheathed-element glow plug furthermore includes at least one sealing element that is connected to the heating element, wherein the at least one sealing element includes at least one element having an elastic property, and wherein the at least one sealing element seals the heating element against the plug housing.

It is disadvantageous that an elaborate preloading process using screws is required to manufacture the pressure measuring glow plug. It is mechanically difficult to apply the large preloads that are required, in particular since the dimensions are small. Preloading cannot be avoided; it must be applied. It is likewise very difficult to compensate for departures from the specific form of the components. Nor is it possible to decouple the pressure measurement from external influences in this manner.

SUMMARY OF THE INVENTION

The problem addressed by the invention can therefore be considered that of creating a method for determining combustion chamber pressure, wherein the aforementioned disadvantages should be avoided while simultaneously reducing the sensitivity to lateral oscillations and decoupling the measuring element from external deformations when the concentricity between the heating rod and the body is greater.

This problem is solved by a device having the features indicated in claim 1, and by a method having the features indicated in claim 5. Advantageous developments of the invention are the subject matter of the dependent claims.

The advantages of the invention lie in the simple implementation. Devices of this type are cost-effective to manufacture. Mainly, however, it is possible to compensate for external influences. The pressure measuring glow plug is decoupled from lateral oscillations and other deformations due to the twofold guidance of the heating rod through the two spring diaphragms and the placement of the measuring elements and reference elements in a neutral plane.

BRIEF DESCRIPTION OF THE DRAWINGS

An embodiment of the invention is presented in the attached drawings, which show.

DETAILED DESCRIPTION

Figure 1:
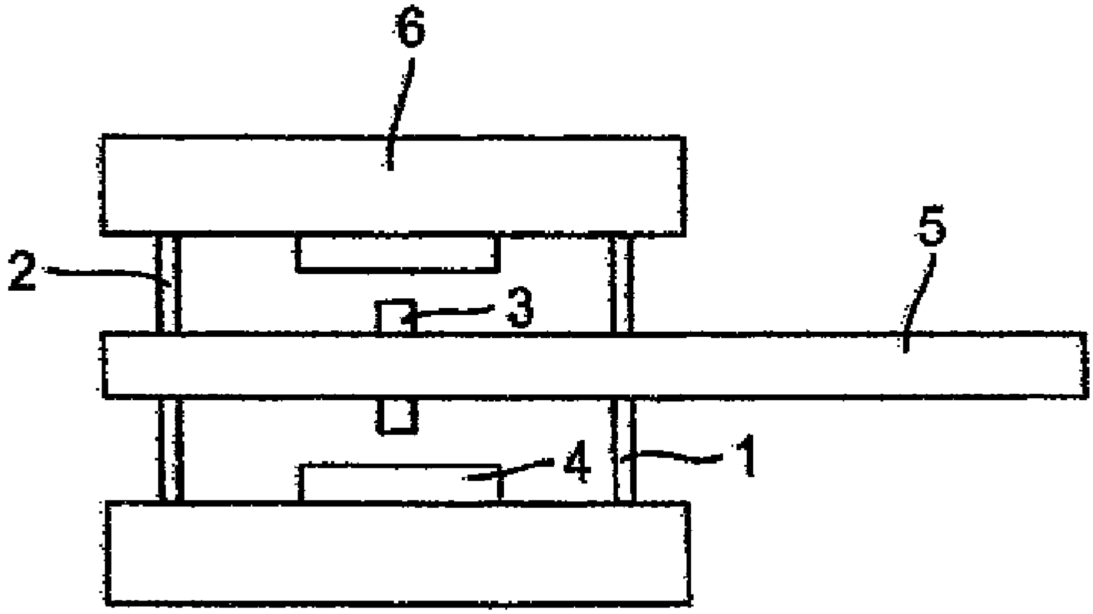
FIG. 1 a pressure measuring glow plug with a displacement measurement
Figure 2:
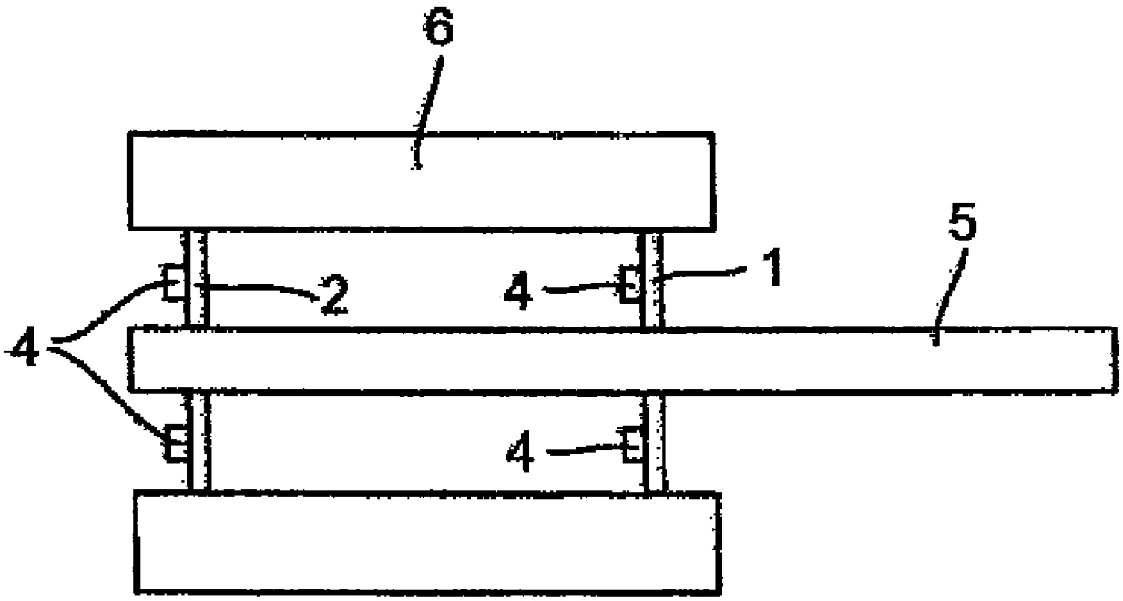
FIG. 2 a pressure measuring glow plug with an alternative displacement measurement FIG. 3 a pressure measuring glow plug that is acted upon by fuel gas pressure FIG. 4 a pressure measuring glow plug that is acted upon by fuel gas pressure, with a deformation measurement of the diaphragm FIG. 5 a pressure measuring glow plug that is acted upon by a disturbance FIG. 6 a pressure measuring glow plug that is acted upon by a disturbance, with a deformation measurement of the diaphragm

The object of a pressure sensor that is integrated in a heating rod and is depicted in FIG. 1, for example, is to measure the fuel gas pressure in the combustion chamber. Heating rod 5 is supported in the center of body 6 using two spring diaphragms 1, 2, which are deformable in the axial direction, and which have the same spring stiffness, thereby allowing heating rod 5 to move axially. A reference element 3, e.g. a magnet, is secured on heating rod 5. A displacement measuring element 4, e.g. an inductive coil, is installed on body 6. An alternative to measuring displacement is to measure the deformation of the diaphragm, as shown in FIG. 2.

One or more elastic sensing elements 4, such as strain gauges (DMS) or capacitive sensors, are installed on each of the two spring diaphragms 1, 2 and send a signal to the control unit of a motor vehicle via a CAN bus via the displacement of the heating rod by the pressure present in the combustion chamber of the internal combustion engine.

Figure 3:
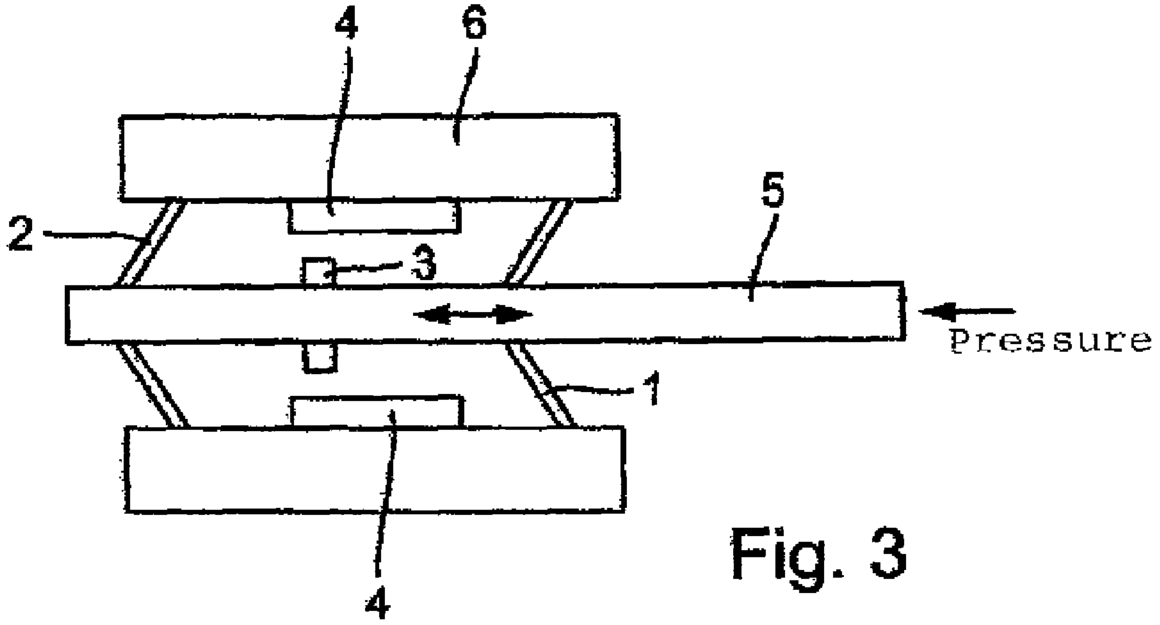

If combustion pressure acts on the effective surface of heating rod 5 and combustion chamber-side spring diaphragm 1, as shown in FIG. 3, the heating rod moves relative to the combustion chamber, and diaphragms 1, 2 deform in the same direction. Measuring element 4 remains in its original position, and reference element 7 moves with heating rod 5. The combustion pressure is deduced from the relative motion between measuring element 4 and reference element 7.

Figure 4:
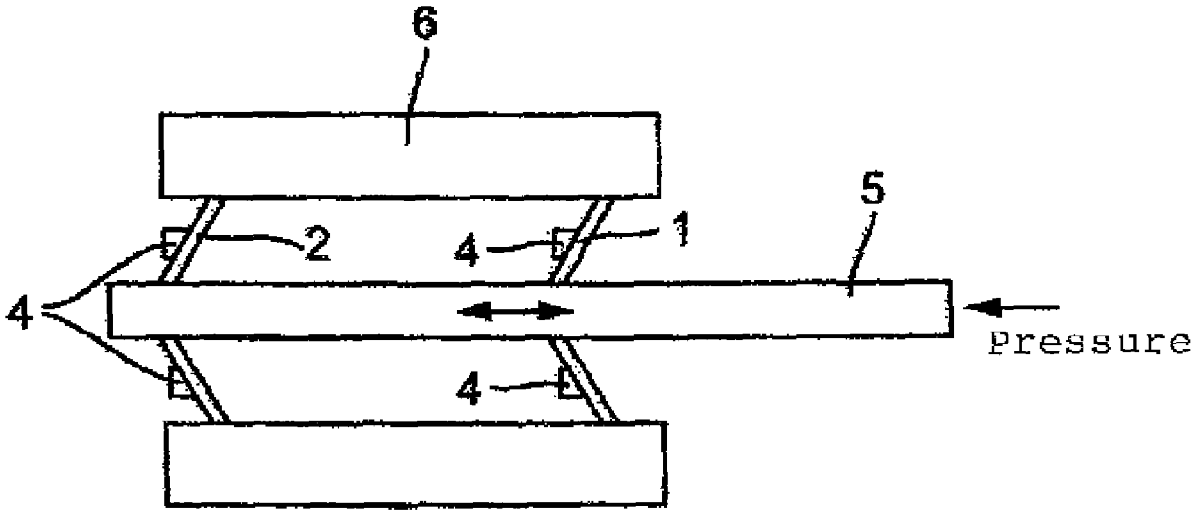

FIG. 4 shows a pressure measuring glow plug acted upon by fuel gas pressure, with measurement of diaphragm deformation. If combustion pressure acts on the effective surface of heating rod 5 and the combustion chamber-side diaphragm, heating rod 5 moves relative to the combustion chamber, and diaphragms 1, 2 deform in the same direction. The combustion pressure is deduced from the deformation of the diaphragm, which is determined by elastic sensing element 4, and is transmitted to the control unit of the vehicle.

Figure 5:
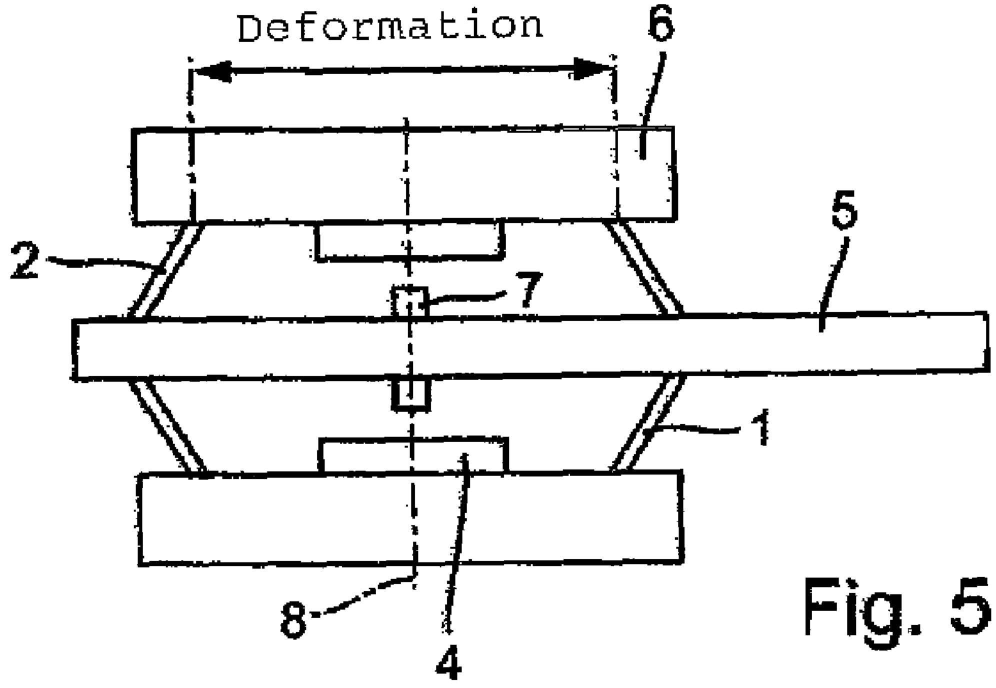

As shown in FIG. 5, a substantial interfering signal that occurs in the measurement is the externally introduced deformation of body 6, which can also cause relative motion to take place between reference element 7 and measuring element 4. To decouple this interference, reference element 7 and measuring element 4 must be disposed in a "neutral plane" 8, where no relative motion occurs during deformation. When the shape of the body is uniform and symmetric, neutral plane 8 is located e.g. in the center of the deformation zone.

Figure 6:
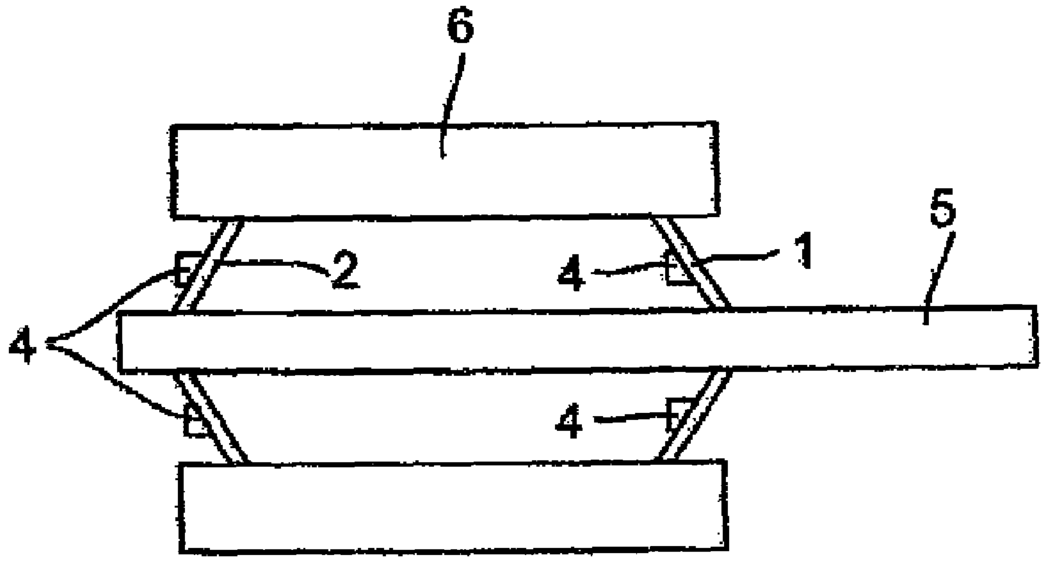

FIG. 6 shows a pressure measuring glow plug that is acted upon by an external deformation, with measurement of diaphragm deformation. If spring diaphragms 1 and 2 have the same spring stiffness and geometry, the two diaphragms deform to the same extent but in opposite directions. This deformation is entirely compensated for by situating and connecting the measuring elements accordingly.

LIST OF REFERENCE CHARACTERS

1. Spring diaphragm
2. Spring diaphragm
3. Reference element
4. Measuring element
5. Heating rod
6. Tubular body
7. Reference element
8. Neutral plane

The invention claimed is:

1. A device for determining combustion chamber pressure, comprising at least one heating rod, at least one measuring element, at least two spring diaphragms and at least one tubular body, said spring diaphragm being disposed concentrically about the heating rod, wherein a sensing element is located on one of the at least two spring diaphragms.

2. The device for determining combustion chamber pressure according to claim 1, wherein the device includes at least one reference element.

3. The device for determining combustion chamber pressure according to claim 1, wherein the tubular body is disposed concentrically about the heating rod.

4. The device for determining combustion chamber pressure according to claim 1, wherein the spring diaphragms are disposed substantially plane-parallel relative to each other.

5. The device for determining combustion chamber pressure according to claim 1, wherein it includes a neutral plane in which a reference element and/or a measuring element are disposed in the non-operative state.

6. A device for determining combustion chamber pressure, comprising a tubular body, a heating rod, at least two spring diaphragms that are deformable in axial direction and bear the heating rod such that it is movable in axial direction, said spring diaphragm being disposed concentrically about the heating rod wherein on each of the diaphragms at least one measuring element is placed, which causes a signal when the heating rod is shifted in axial direction.

7. A device for determining combustion chamber pressure, comprising:

a tubular body having a first and second end;

a heating rod located within the tubular body;

a first diaphragm attached to and between the tubular body and the heating rod;

a second diaphragm attached to and between the tubular body and the heating rod;

a measuring element disposed between the first and second diaphragms and between the tubular body and the heating rod; and a reference element disposed between the first and second diaphragms and between the tubular body and the heating rod;

wherein the measuring element and the reference element are oppositely attached to either the tubular body or the heating rod.

8. The device of claim 7, wherein both the measuring element and reference element are substantially centered between the first and second diaphragms.

* * * * *